United States Patent

H'mimy et al.

(10) Patent No.: US 6,442,151 B1
(45) Date of Patent: Aug. 27, 2002

(54) SYSTEM AND METHOD FOR VARIABLE REASSIGNMENT OF TRANSMISSION CHANNELS

(75) Inventors: Hossam H. H'mimy, Plano; Ali R. Shah, Dallas, both of TX (US)

(73) Assignee: Ericsson Inc., Richardson, TX (US)

( * ) Notice: Subject to any disclaimer, the term of this patent is extended or adjusted under 35 U.S.C. 154(b) by 0 days.

(21) Appl. No.: 09/287,140

(22) Filed: Apr. 6, 1999

(51) Int. Cl.[7] .............................................. H04Q 7/20
(52) U.S. Cl. ...................... 370/333; 370/329; 370/330; 370/332; 370/333; 455/423; 455/450; 455/452; 455/509; 455/512; 455/513
(58) Field of Search ..................... 455/62, 450, 452, 455/509, 512, 513; 370/329, 330, 331, 332, 333

(56) References Cited

U.S. PATENT DOCUMENTS

| | | | | |
|---|---|---|---|---|
| 5,287,544 A | * | 2/1994 | Menich et al. ............. 455/33.1 |
| 5,448,750 A | * | 9/1995 | Eriksson et al. ........... 455/33.1 |
| 5,774,808 A | * | 6/1998 | Sarkioja et al. ............. 455/436 |
| 5,956,642 A | * | 9/1999 | Larsson et al. ............. 455/449 |
| 6,006,092 A | * | 12/1999 | Ward .......................... 455/438 |

* cited by examiner

Primary Examiner—Daniel Hunter
Assistant Examiner—Andrew T Harry
(74) Attorney, Agent, or Firm—Godwin Gruber, P.C.; Arthur I. Navarro

(57) ABSTRACT

A method of assigning a channel to a service in a wireless communications network based on interferences levels and channel quality. Channels are preassigned and then reassigned using an algorithm that assigns a channel to a service based on uplink interference and channel quality measurements. Reassignment can be achieved in one processing pass, rather than requiring multiple iterations.

28 Claims, 2 Drawing Sheets

SYSTEM AND METHOD FOR VARIABLE REASSIGNMENT OF TRANSMISSION CHANNELS

CROSS-REFERENCE TO RELATED APPLICATIONS

The application is commonly assigned and related to U.S. patent application Ser. No. 09/250,629 entitled "Channel Assignment Based on Uplink Interference Level and Channel Quality Measurements With a Forward and Backward Reassignment Step ", filed Feb. 16, 1999, and U.S. patent application Ser. No. 09/224,069 entitled "A System and Method for Channel Assignment Based on Uplink and Interference Level in Channel Quality Measurements" by H'mimy et al. filed Dec. 30, 1998, both of which, are incorporated herein by reference.

TECHNICAL FIELD

The invention relates generally to wireless communication systems, and, more particularly, to a system and method for preassigning and reassigning a transmission channel based on channel characteristics, such as the interference and quality of a transmission channel using variable reassignment.

BACKGROUND OF THE INVENTION

The increased demand for wireless (or cellular) communications has resulted in advanced communications systems capable of providing a high quality of service to more users. The systems that have emerged include analog systems such as Advanced Mobile Phone System (AMPS), and digital systems such as the Global System for Mobile Communications (GSM) and Digital AMPS (D-AMPS). To implement these systems, cellular based communication devices operate in interference-limited environments that rely on frequency reuse plans to maximize capacity and quality. Protocols such as the Frequency Division Multiple Access (FDMA) in analog systems, and the Time Division Multiple Access (TDMA) in digital systems are used for this purpose.

Because bandwidth is a limited resource (both in a physical and regulatory sense), schemes to divide the available network resources among as many subscribers as possible are often employed. One such scheme which seeks to maximize bandwidth allocation efficiency involves a combination TDMA and FDMA (TDMA/FDMA). For example, a 25 MHZ bandwidth can be divided into 124 carrier frequencies spaced 200 kHz apart, with one or more carrier frequencies assigned to each Base Station in the network. Each of the carrier frequencies, in turn, can be divided in time using a TDMA scheme to define logical channels. Channels, in turn, may be divided into dedicated subchannels which are allocated to a mobile station.

A traffic channel, also commonly called a communication or transmission channel, is used to carry speech and data (typically non-command) signals over the network. Traffic channels are defined in GSM using a multi-frame, or a group of 26 separate TDMA frames. With 26 frames, typically 24 will be used for speech or data, one as a control channel, and one will be unused. In other systems, such as Code Division Multiple Access (CDMA) or FDMA, other methods are used. In addition to dividing bandwidth among subscribers, traffic channels are assigned or allocated to incoming calls. Often, to increase channel efficiency, connection quality, and the number of potential channels available for subscribers within a base station operating area, an Idle Channel Measurement (ICM) algorithm is used to pre-select and assign channels for the transmission of speech and data signals.

Two methods of channel assignment are typically used in the industry: fixed channel assignment and dynamic channel assignment. Fixed channel assignment involves assigning a predetermined set of channels or frequencies to the base station or base station controller (BSC). If all the channels within the cell of the base station or BSC are occupied, and a call attempt is made, either the call is blocked, meaning the mobile handset does not receive service, or borrowing strategies utilize channels from neighboring cells to connect the call.

With dynamic channel assignment, channels are not allocated to a BSCs permanently. The Mobile Switching Center (MSC) distributes and redistributes frequencies among BSCs and base stations. The assignments remain fixed only for a period of time. Then, periodically, some measurements are made regarding channel utilization, and adjustments are made to the channel assignments as needed. The channels may be reallocated by a BSC each time a call request is made to more efficiently allocate channels among base stations.

A problem with prior art channel assignment algorithms and devices is that channel assignments are typically made based on the lowest interference level available even though medium interference channels would suffice given the channel quality between the mobile and the switching device. This results in an unbalanced use of traffic channels, and an increase in interference between channels. In addition, methods that assign channels solely on the basis of interference measurements may refuse connections for calls even when a lower quality channel is available to service a call, and could be implemented with no noticeable quality difference by the mobile station subscriber.

Furthermore, present systems of channel reallocation typically iterate to a best channel by searching adjacent channels one at a time. Iterating along adjacent channels to a channel with less interference requires constant processing. An assignment method that reduces overall system processing requirements, and more evenly allocates channels across the available transmission channels would be advantageous. The present invention provides such a system and method.

SUMMARY OF THE INVENTION

The present invention provides a method and system for decreasing the high processing requirements that result from prior art transmission channel allocation algorithms. Channels are preassigned and then reassigned using an algorithm that assigns service variably to a channel based on uplink interference and channel quality measurements. Reassignment may be achieved in one processing pass, rather than requiring multiple iterations. The present invention also solves the problem of channel crowding by initially preassigning service to a channel having a relatively high, but acceptable interference level, and then reassigning the service to a second channel only when necessary to improve channel quality.

Disclosed in one embodiment, is a method of assigning transmission channels to a service in a wireless communications network. The method comprises the step of preassigning a first transmission channel to the service, the transmission channel having an interference level less than a predetermined blocking threshold. Next, the service is reassigned to a second channel based on the channel quality and interference level. If reassignment is necessary, a second channel is selected so that the lower the channel quality of the first channel the lower the interference level of the second channel. A rule table defining bands of interference and categories of channel quality may be used to select the second channel. With variable reassignment the location of the interference band for the second channel may be a variable distance away from the interference band of the preassigned first channel.

The method may also be performed by assigning transmission channels according to a set of predefined interference bands and categories of channel quality. Variable reassignment segregates transmission channels in the network into a number of interference bands, ranging from a best interference band to a worst interference band as well as into categories of channel quality ranging from the lowest channel quality to highest channel quality. Channel quality can be measured as a Bit Error Rate (BER) or as a carrier to interference ratio (C/I) of the preassigned transmission channel. To maximize the number of channels utilized in the network, the step of preassigning could select the first channel as an available channel with the highest interference level less than a predetermined interference blocking threshold.

Also disclosed is a method of assigning a channel in a wireless communications network having a plurality of transmission channels. The method comprises the steps of measuring an interference level for each of the plurality of channels, assigning each of the plurality of channels to an interference band, preassigning a first channel to a service, measuring the channel quality of the first channel and reassigning the service from the first channel to a second channel when the channel quality of the first channel becomes unsatisfactory, such that the second channel is selected based on the interference level and channel quality of the first channel using variable reassignment.

Also disclosed is a device for use in a wireless communication network have a plurality of transmission channels, the device containing an algorithm for assigning transmission channels to a request for service. The algorithm comprises a discrimination function adapted to the determine the interference and channel quality of transmission channels in the network. A preassignment function is adapted to preassign a first transmission channel with an interference level less than a predetermined block and threshold to the service. The algorithm also includes a monitoring function adapted to continually monitor the channel quality of the preassigned transmission channel and a variable reassignment function that reassigns the service to a second transmission channel when the channel quality of the preassigned channel becomes unsatisfactory. The algorithm can include a segregation function configured to classify transmission channels according to bands of interference and categories of channel quality. The segregation function can be further adapted to create a rule table containing a configuration of the categories of channel quality and bands and interference, the rule table used by the variable reassignment function when reassigning a service to a second transmission channel.

The technical advantages of the present invention are numerous and include making the channel quality distribution in the system more uniform, reducing co-channel distance with increased transmission quality and capacity, and reducing system processing requirements of the communications network.

BRIEF DESCRIPTION OF THE DRAWINGS

The above features of the present invention will be more clearly understood from consideration of the following detailed description taken in connection with accompanying drawings in which.

Corresponding numerals and symbols in the figures refer to corresponding parts in the detailed description unless otherwise indicated.

DETAILED DESCRIPTION OF PREFERRED EMBODIMENTS

Figure 1:
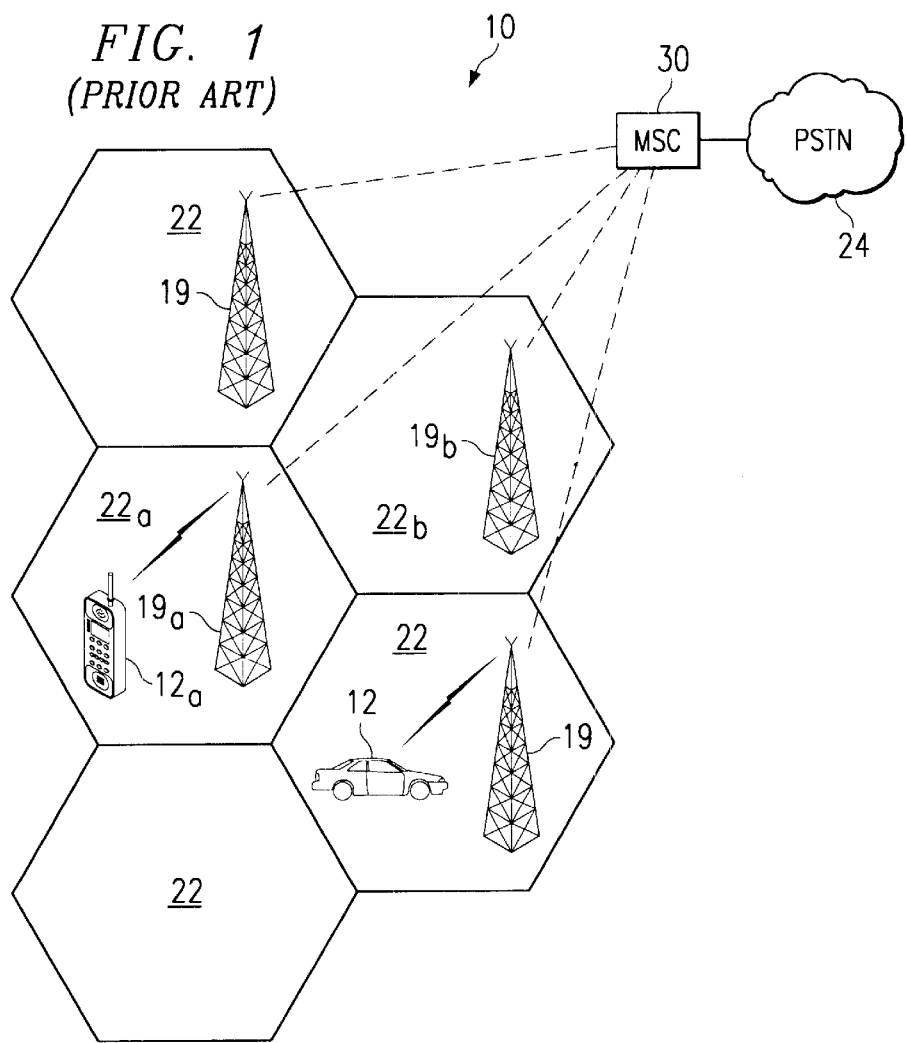
FIG. 1 illustrates a typical cellular network in which the invention can be practiced.

With reference to FIG. 1, therein is shown a diagram of a wireless communications network 10 The network 10 is seen to include an originating mobile station (MS) 12, which can be a wireless communications device such as a Personal Communications Service (PCS) or cellular phone, but may also include a computer, a Personal Digital Assistant (PDA), or other wireless terminal, for example. A base station 19 provides cellular coverage via a radio frequency (RF) link to the MS 12 and other mobile stations within the cells 22 of network 10 The terms "cell" or "cells" will be referred to interchangeably. Typically, several base stations 19 service a single MSC 30 through base station controllers (BSC) 28 to provide continuous geographical coverage. For illustrative purposes only, the coverage area of a particular cell 22 is shown as hexagonal.

As the MS 12 moves between a first cell 22a to a second cell 22b, service (a call or data transmission) is handed off from a first base station 19a servicing the MS 12a in the first cell 22a to a second base station 19b in the second cell 22b. As the MS 12a crosses the region serviced by the base station 19b in the second cell 22b, the MS 12a is arriving at the transfer of the communication from the first base station 19a to the second base station 19b (called a "handoff"). A hand-off is typically managed by control systems contained in the Mobile Switching Center (MSC) 30. MSC 30 is typically in communication with multiple BSCs 28, as well as to fixed networks, such as the Public Switched Telephone Network (PSTN) 24 or an optical network, for example.

Figure 2:
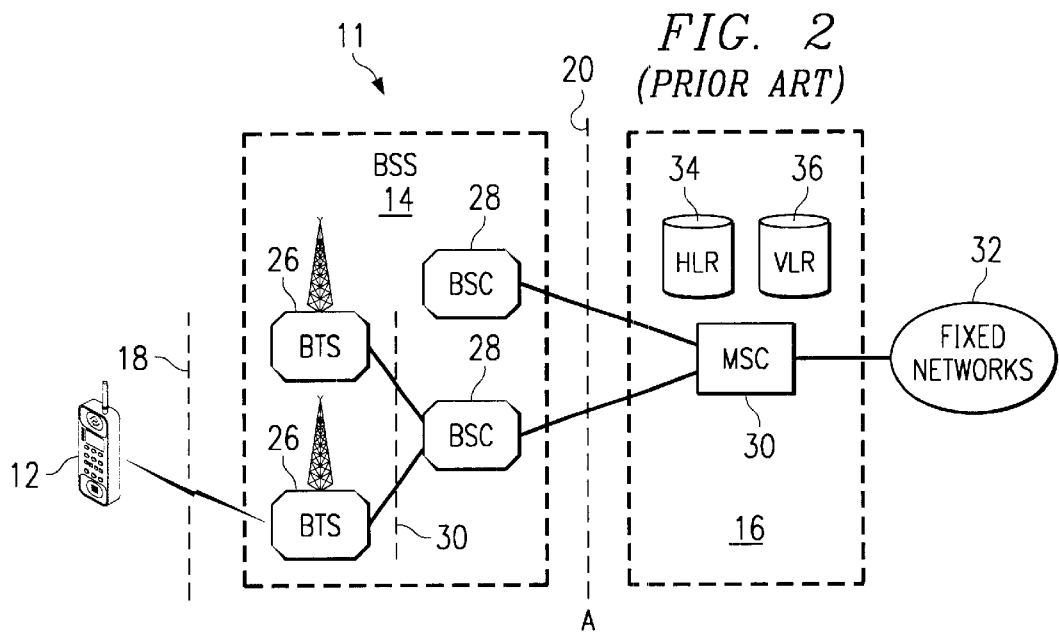
FIG. 2 shows a GSM network in which the invention may be practiced.

FIG. 2 shows the typical layout of a GSM network 11 having three main parts: a MS 12, a Base Station Subsystem (BSS) 14, and network subsystem 16. The MS 12 is typically a cellular telephone that is carried by the subscriber. The network subsystem 16, includes a MSC 30, that performs the call switching functions between network users, as well as mobility management. The mobile station 12 and the BSS 14 communicate with one another across an interface 18, known as the air interface (or radio link, or Um interface). Furthermore, the BSS 14 communicates with the MSC 30 of network subsystem 16 across an A-interface 20. Likewise, MSC 30 communicates with fixed networks 32 which may be the PSTN or other cellular networks, for example.

The mobile station 12 usually includes a mobile transceiver and a Subscriber Identity Module (SIM). The SIM may include an identity indicator (a "secret" key for authentication), and other relevant network/user information. The mobile transceiver itself is uniquely identified by the International Mobile Equipment Identity (IMEI—typically, a telephone number). The identification features of the MS 12 are independent, thereby allowing mobility of the user about the service area of the GSM network 11.

The BSS 14 typically comprises two parts: the Base Transceiver Station (BTS) 26 (commonly called a base station), and the Base Station Controller (BSC) 28. BTS 26 communicates across a standardized Abis interface 30 with BSC 28, allowing operation between components. BTS 26 houses radio transceivers that communicate across a cell 22, and the BTS 26 handles the radio-link protocols that facilitate communication with the mobile station 12. BSC 28 manages the radio resources for one or more BTSs 26, and, likewise, there may be several BSCs 28 within a single BSS 14. BSC 28 provides a communications platform between the mobile station 12 and the MSC 30 of network subsystem 16 which acts as an interface to one or more fixed networks 32. Among the other functions of the BSC 28 are radio-channel setup, frequency hopping, and handovers.

The central component of the network subsystem 16 is the Mobile Switching Center (MSC) 30, which mirrors the performance of a normal switching node of the PSTN, and provides all of the functionality needed to handle mobile subscriber communications, such as registration, authentication, location updating, handovers, and call routing to roaming subscribers. These functions are provided in conjunction with several other network entities.

The MSC 30 provides the connection mechanism to the fixed networks 32 which may include the PSTN or an Integrated Service Digital Network (ISDN), for example. The Home Location Register (HLR) 34 and Visitor Location Register (VLR) 36, together with the MSC 30, provide call routing and roaming capabilities for the GSM network 11. In particular, the HLR 34 contains administrative information of the subscriber registered in the corresponding GSM network 11, along with the current location of the mobile handset 12. Likewise, the VLR 36 contains selected administrative information from a MS's HLR 34 necessary for call control and provisioning of the subscriber services for each mobile currently located in the geographical area controlled by the VLR 36. Other registers are used for authentication and security functions within the network subsystem 16.

The related applications involve forward and backwards reassignment, where channels are reassigned to channels with lower interference levels or higher interference levels based on the characteristics of the current transmission channel. In forward channel reassignment, before service to the MS 12 is assigned to a channel, the BSC 28 measures the interference level of all channels available, and then selects some of the channels and marks them as preassigned. Thus, service to the MS 12 is preassigned to a specific channel, then the quality of the preassigned channel is monitored.

A measure of the preassigned channel's quality may be derived from the Bit Error Rate (BER) for digital networks, or carrier/interference (C/I) for analog networks, for example. If the channel quality satisfies certain conditions, then the call is either continued on the current channel, reassigned to another channel having a better or lower interference level, handed-off, or dropped. This process of reassigning the call to a better channel is referred to as a forward reassignment. Other channel assignment algorithms also focus on searching for a channel with a better channel quality, or a lower interference level. Likewise, reverse channel assignment reassigns calls to channels having higher interference levels in an effort to balance the system, which is particularly useful in high traffic networks. The present invention can be applied in networks using either forward or reverse channel reassignment as well as other techniques of transmission channel assignment.

Searching for suitable channels in the network can place tremendous processing burdens on the BSC 28, the MSC 30 as well as other network components in order to find channels with suitable interference levels. Such processing demands can consume considerable resources of the network since multiple and continuous iterations are often required to arrive at the best channel for a particular service.

The present invention, as described below, reduces system processing requirements by reassigning a service from a preassigned channel to a second channel based on the interference level and/or the channel quality of the preassigned channel. Transmission channels are segregated into bands of interference and categories of channel quality. The bands and categories can be stored in a rule table that is utilized during reassignment. Service is reassigned such that a new channel is chosen, based on the characteristics of the preassigned channel. The interference bands and categories of channel quality can be stored.

Interference Bands

The present invention contemplates the use of an algorithm to implement variable reassignment in a wireless communication network. In one embodiment the algorithm includes a setup step in which interference measurements are taken (initially on the uplink) and used to segregate available channels into interference bands based on the measured levels of interference. After the uplink interference of channels in the system is measured, the channels are categorized into "n+1" interference bands separated by "n" thresholds. The actual value of "n" depends on the requirements of the system and is selected by a system operator. A larger value of "n" usually imposes a greater processing burden to implement the algorithm. Accordingly, given "n" interference thresholds, $I_1$, $I_2$, ... $I_n$, there are "n+1" interference bands $I^1$, $I^2$ ... $I^{n+1}$. correspondence between interference thresholds and interference bands is shown in Table 1.

According to one embodiment, the algorithm takes an incoming request for service (communications, calls or data transfers, for example) and preassigns the service to a channel having an interference level which is believed, based on experience and the requirements of the network, to provide adequate quality for continued operation (meaning that no reassignment should be necessary) of the service. Once a channel is preassigned, further interference measurements may be taken and the service may be reassigned to a transmission channel having a different interference bands.

TABLE 1

| Condition | Interference Band |
| --- | --- |
| $I > I_n$ | $I^{n+1}$ (blocked interference band) |
| $I_{n-1} < I < I_n$ | $I^n$ |
| . | . |
| . | . |
| . | . |
| $I_1 < I < I_2$ | $I^2$ |
| $I < I_1$ | $I^1$ |

With reference to Table 1, channels with interference level measurements within the highest interference band are always blocked, which implies that $I_n$ is the blocking threshold. The blocking threshold depends on the system implementation and is typically predetermined by the network system operator. Note that the bandwidth of the interference bands need not be the same, and are in fact, typically non-uniform.

Channel Quality Categories

Once service is assigned to a channel, indicators of the channel quality can be measured to determine the channel quality of the preassigned channel. Initially, the channel quality of all channels in the network can be determined and the channels segregated into categories of channel quality. Similar to the interference bands, channels can be classified according to channel quality divided into categories $Q^1$, $Q^2$, ... $Q^{m+1}$ where "m" is the number of channel quality thresholds. The thresholds could be chosen to evenly divide the number of bands, or to segregate transmission channels into channel quality categories that indicate similar levels of quality.

The lowest quality category band, $Q^1$, indicates unacceptable channel quality, and the process 100 will either perform a hand-off, or, if a hand-off is not possible, drop the service. Accordingly, the threshold $Q_1$ is designated as the hand-off threshold. The Channel Quality Measurements (CQM) could be based on any suitable quality indicator, such as carrier to interference ratios (C/I) for analog systems, and Bit Error Rate (BER) measurements for digital systems, among others. Categories of CQM according to one embodiment are shown in Table 2.

| CQM Category | Analog | Digital |
| --- | --- | --- |
| $Q^{m+1}$ | $C/I > (C/I)_m$ | $BER < BER_1$ |
| $Q^m$ | $(C/I)_{m-1} < C/I < (C/I)_m$ | $BER_2 > BER > BER_1$ |
| $Q^{m-1}$ | $(C/I)_{m-2} < C/I < (C/I)_{m-1}$ | $BER_3 > BER > BER_2$ |
| . | . | |
| . | . | |
| . | . | |
| $Q^2$ | $(C/I)1 < C/I < (C/I)2$ | $BER_{m-2} > BER > BER_{m-1}$ |
| $Q^1$ | $C/I < (C/I)1$ | $BER > BER_m$ |

Variable Reassignment

With variable reassignment, when a request for service is received, such as an incoming call to the network (which could be a voice call, or data connection, for example), a channel is preassigned to a first transmission channel, and the service is reassigned (when needed) to a second channel the location of the interference band associated with the second channel can be a variable distance away from the location of interference band associated with the preassigned channel. More specifically, according to one embodiment initially a channel is preassigned to service based on interference level of the channel and reassignment if the quality of the channel becomes unacceptable. If necessary, the service is reassigned to a second channel using variable reassignment to select a second channel that is a variable distance from the preassigned channel.

Initially, the interference level of all channels in the network is determined. This is followed by segregation, wherein channels in the network are classified into bands based on their interference level (as shown in Table 1). Then, to insure as many available channels are used as possible, an incoming request for service is pre-assigned to a channel within a high interference band which is believed to be adequate to provide service. Then, after preassignment, the channel quality of the preassigned channel is measured, and the channel is classified into a category of channel quality based on, for example, it's C/I or BER measurements (as shown in Table 2). With variable reassignment, an incoming request for service is reassigned to a channel that is a variable distance away from the preassigned channel. The fact that variable reassignment is utilized eliminates multiple channel assignment iteration found with prior art assignment algorithms and systems.

Depending on the channel quality category, the call is either kept on the same channel (continued), reassigned to a channel falling into a lower interference band or the call may be dropped/handed-off. The call is dropped if a hand-off candidate on another system is not available. Call reassignment to a channel in a lower interference band ensures an interference level on the reassigned channel that is below the one on the preassigned (or previously assigned) channel by a predetermined value. In other words, the channel quality should increase by at least a predetermined value. However, it is worthy to note that should the quality be more than adequate for continuing operation, reassignment to a higher interference band may be desired to evenly distribute calls within a network, as discussed in the related applications.

Figure 3:
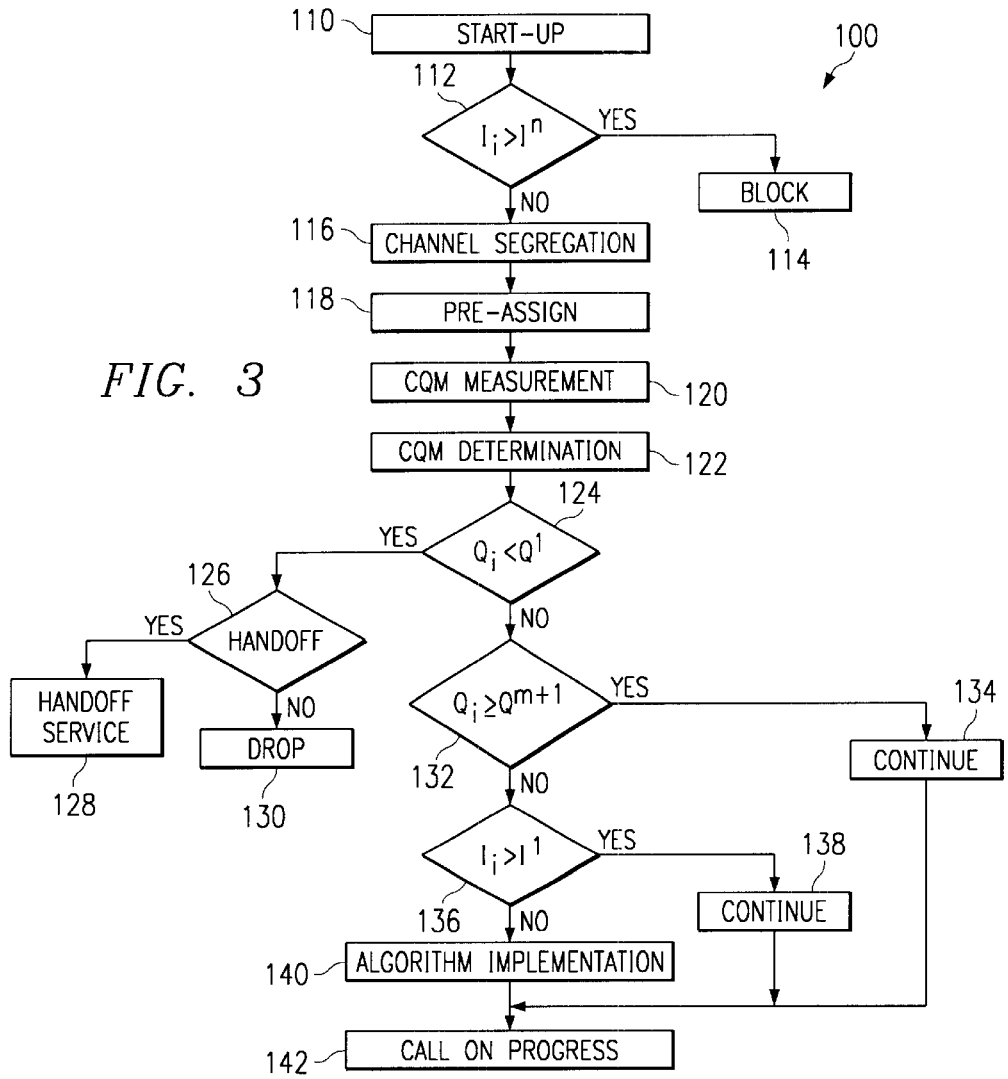
FIG. 3 is a process flow diagram of variable reassignment according to one embodiment.

FIG. 3 is a process flow diagram, denoted generally as 100, illustrating a method of variable reassignment according to one embodiment of the invention. It is contemplated that variable reassignment according to the invention could be implemented within one or more components of a wireless communications network 10 or GSM network 11, such as in a Base Station controller 28 or Base Station Subsystem 14 or other similar device. The algorithm can be embodied in software, hardware or other operable combination. Thus, the terms process, method and/or variable reassignment algorithm shall be used interchangeably throughout. Process 100 begins at step 110, wherein the uplink interference level for each channel in the network is measured. Then at step 112, the channel reassignment algorithm tests to see whether the interference for each channel is greater than a predetermined maximum allowable interference threshold $I_n$. If the interference level for a particular channel is greater than the maximum allowable interference threshold, then the channel is blocked at step 114. If the channel interference level for a specific channel is not greater than the maximum allowable interference threshold, then process 100 is directed to channel segregation at step 116.

During channel segregation, step 116, channels in the network are organized into interference bands )as discussed in the above Interference Band section) from a lowest interference band represented a $I^1$ to a highest allowable interference band represented as $I^{n+1}$. Process 100 is directed to preassignment, step 118, where each call request is preassigned to an unblocked channel having as high an interference level as possible. Next, the process 100 proceeds to a CQM step 120, that computes channel quality based on, for example, C/I ratios for analog systems or BER measurements for digital systems. Process 100 is then directed to step 122 wherein channels are segregated or classified into categories of channel quality based on the CQM measurements (as depicted in Table 2 and discussed in the above Channel Quality Categories section).

Next, process 100 is directed to step 124, wherein the channel reassignment algorithm determines if the preassigned channel lies within the channel quality category band $Q^1$. If so, the process 100 proceeds to a hand-off test at step 126 to see if a hand-off to another base station, another base station controller, or another serving system is possible. If so, the process 100 proceeds to a hand-off service at step 126 where service is handed-off (passed) according to well established methods known to those of ordinary skill.

If hand-off cannot be accomplished, then process 100 is directed to a drop step 130 where the service is discontinued. If the quality of the channel is not of an unacceptable quality, then process flow is directed to step 130 where it is determined if the channel quality is better. If, it is determined at step 130 that the channel quality is within a high channel quality category band, service is continued, step 134 to a call on progress, step 142.

If, it is determined at step 130 that channel quality is not within the high quality band, the process 100 is directed to step 136 where it is determined if the interference level of the preassigned channel is within the best interference band available. If so, then process 100 is directed to step 138, where the call is continued to a call on progress 142. In essence, step 138 allows service that has been assigned to a less than desirable category of channel quality to continue when channel quality is acceptable and the amount of interference cannot be improved. If, however, it is determined at step 136 that the preassigned channel, is not within the best available interference band, then process 100 is directed to the algorithm implementation, step 140.

quality category of the preassigned channel, and the channel's interference band.

Figure 4:
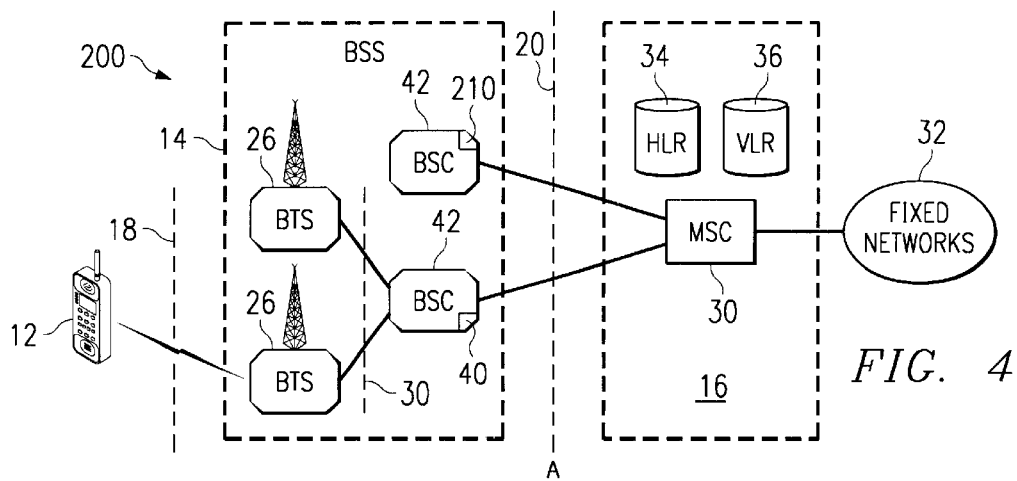
FIG. 4 illustrates a GSM network utilizing variable assignment.

Turning now to FIG. 4, a wireless communications network 200 adapted to implement variable reassignment according to the invention is shown. The network 200 includes the MS 12 in communication with other network elements including the BTS 26 the BSC 42, the MSC 30 as well as the fixed network 32. The BSS 14 now includes BSC 42 with an integrated variable reassignment algorithm 210 It should be understood that the variable for the reassignment algorithm 210 can be adapted and configured within other

TABLE 3

| Band/ x Category | $I^{n+1}$ | $I^n$ | $I^{n-1}$ | ... $I^4$ | $I^3$ | $I^2$ | $I^1$ |
|---|---|---|---|---|---|---|---|
| $Q^{m+1}$ | Blocked | Continue | Continue | ... Continue | Continue | Continue | Continue |
| $Q^m$ | Blocked | R. -> $I^{n-1}$ | R -> $I^{n-2}$ | ... R -> $I^3$ | R -> $I^2$ | R -> $I^1$ | Continue |
| $Q^{m-1}$ | Blocked | R -> $I^{n-2}$ | R -> $I^{n-3}$ | ... R -> $I^2$ | R -> $I^1$ | R -> $I^1$ | Continue |
| $Q^{m-2}$ | Blocked | R -> $I^{n-3}$ | R -> $I^{n-4}$ | ... R -> $I^1$ | R -> $I^1$ | R -> $I^1$ | Continue |
| | Blocked | | | | | | |
| $Q^4$ | Blocked | R -> $I^{d(x+2)+1}$ | R -> $I^{d(x+1)+1}$ | R -> $I^1$ | R -> $I^1$ | R -> $I^1$ | Continue |
| $Q^3$ | Blocked | R -> $I^{d(x+1)+1}$ | R -> $I^{d(x)+1}$ | R -> $I^1$ | R -> $I^1$ | R -> $I^1$ | Continue |
| $Q^2$ | Blocked | R -> $I^{d(x)+1}$ | R -> $I^{d(x-1)+1}$ | R -> $I^1$ | R -> $I^1$ | R -> $I^1$ | Continue |
| $Q^1$ | Blocked | Drop | Drop | Drop | Drop | Drop | Drop |

Where x=n−m and d(y)=y is y>0, and 0 otherwise

Table 3 demonstrates one exemplary method of achieving algorithm implementation, step 140 according to one embodiment. Table 3 is divided along its horizontal axis into $I^{n+1}$ interference bands (the group of channels in a band is called a "set"), and along its vertical axis into $Q^{n+1}$ categories of channel quality, corresponding to the bands of Table 1 and Table 2. The interference band designations and categories of channel quality classifications are the same as discussed above, i.e., $I^1$ represents the lowest interference band and $I^{n+1}$ represents the highest interference band, while $Q^1$ represents a lowest CQM and $Q^{n+1}$ represents a highest CQM. The formulas in the blocks in Table 3 can be used to implement the algorithm implementation, step 140.

As illustrated in FIG. 3, if a call lies in the CQM category band $Q^m$, the algorithm directs reassignment of the service to an interference band which is adjacent to the current interference band. Likewise, if the preassigned transmission channel lies in the CQM category band $Q^{m-2}$ the algorithm directs reassignment of the service to a second channel that is several bands better than the current channel. Thus, the interference band to which the service is reassigned can vary based on the current uplink interference and channel quality of the preassigned channel.

Generally, as the CQM category of the preassigned channel is lower (indicating lower quality channels), larger "jumps" to bands of less interference are made as indicated by the formulas in the blocks along the row corresponding to $Q^2$. The transmission channel to which service is reassigned from the set of channels having interference level [(n−m)+(j−2)−p]+1, has an interference band represented as $I^{[(n-m)+(j-2)-p]+1}$, where the preassigned channel is characterized as having a channel quality band Qi and an interference band $I^k$, in a system having a plurality of n+1 interference bands whereby the $I^k$ interference band is also known as the $I^{n-p}$ interference band (k=n−p), and n>m. Thus, the algorithm implementation, step 140 reassigns a channel variably, but predictably, based upon the channel network elements of the BSS 14 according to various embodiments of the invention. For example, the variable assignment algorithm 210 can be implemented within another control element of the BSS 14 or at the BTS 26 to provide similar operation according to the invention. Other variations and adaptations of the variable reassignment algorithm 210 will become apparent to those of ordinary skill in the art.

The particular implementation of the variable reassignment algorithm 210 depends on the network vendor and system operator. For example, the variable reassignment algorithm 210 can be implemented as a software application that controls a hardware platform to assign transmission channels to service according to the invention. The variable reassignment algorithm 210 works in connection with a device or system capable of monitoring channel quality and interference levels across all transmission channels of the network 200. In addition, the variable reassignment algorithm 210 can include a data base or other similar structure or configuration that is capable of storing categories of channel quality and interference bands for all transmission channels in the network 200. This aspect of the variable reassignment algorithm 210 can be embodied in a discrimination function adapted to determine the interference and channel quality of transmission channels in the network 200.

The variable reassignment algorithm also includes a preassignment function adapted to preassign a first transmission channel to an incoming request for service to the network 200. The preassignment function can be configured to assign the first available transmission channel to the service that is less than a predetermined blocking threshold of interference. Other channel characteristics may be used by the preassignment function in selecting a first channel to preassign.

Next, the variable reassignment algorithm 210 is configured to assign a second channel to the service when monitored levels of channel quality become unsatisfactory for the network 200. In essence, selection of a second channel is based on the interference bands and categories of channel quality outlined in Table 3 above. Other aspects of the variable reassignment algorithm 210 include the ability to perform hand-offs, disconnects, and call-on progress.

While the invention has been described with reference to illustrative embodiments, this description is not intended to be construed in a limiting sense. Various modifications in combinations of the illustrative embodiments, as well as other embodiments of the invention, will be apparent to persons skilled in the art upon reference to the description.

What is claimed is:

1. In a wireless communications network having a plurality of channels for assignment to service, a method of assigning a channel to a service comprising the steps of:
    preassigning a first channel to the service, said first channel having an interference level less than a predetermined blocking threshold;
    monitoring the channel quality and interference level of the first channel; and
    reassigning the service to a second channel based on the interference level and channel quality of the first channel.

2. The method of claim 1 wherein the step of reassigning the service to a second channel is performed using variable reassignment.

3. The method of claim 1 wherein the step of preassigning a first channel to the service is preceded by the steps of:
    classifying all channels in the network into bands of interference according to measured levels of interference; and
    classifying all channels in the network into categories of channel quality according to measured levels of channel quality.

4. The method of claim 3 further comprising the step of storing the bands of interference and categories of channel quality into a configuration defining a rule table.

5. The method of claim 4 wherein the step of reassigning the service to a second channel is performed using said rule table.

6. The method of claim 1 wherein the step of reassigning the service to a second channel is performed so that the lower the quality measurement of the first channel the lower the interference level of the second channel.

7. The method of claim 1 further comprising the steps of:
    segregating channels in the network into some number, represented as n+1, of interference bands, in order from a best interference band, represented as $I^1$, to a worst interference band, represented as $I^{n+1}$, based on measured levels of interference for channels in the network; and
    segregating channels in the network into some number, represented as m+1, of categories of channel quality in order from a lowest quality category, represented as $Q^1$, to a highest quality category, represented as $Q^{m+1}$.

8. The method of claim 6 wherein the step of reassigning the service is performed so that service is handed-off if the channel quality measurement of the first channel is in band $Q^1$.

9. The method of claim 6 wherein the step of reassigning the service is performed so that service is dropped if the channel quality of the first channel is in band $Q^1$.

10. The method of claim 6 wherein the step of reassigning the service is performed so that the second channel is within interference band $I^1$.

11. The method of claim 6 wherein the step of reassigning the service is performed so that for a first channel having a channel quality category $Q^j$ and an interference band $I^k$, where j+k=n+2 and n>m, the second channel is within interference band $I^{(n-m)+1}$.

12. The method of claim 6, wherein the step of reassigning the service is performed so that for a first channel having a channel quality category $Q^j$ and an interference band $I^{n-p}$ and n>m, the second channel is within interference band $I^{[(n-m)+(j-2)+p]+1}$.

13. The method of claim 1 wherein the step of monitoring channel quality is performed so the Bit Error Rate (BER) of the first channel is determined.

14. The method of claim 1 wherein the step of monitoring channel quality is performed so that the carrier-to-interference (C/I) ratio of the first channel is determined.

15. The method of claim 1 wherein the step of preassigning as first channel is performed by selecting the first available channel with the highest interference level less than the predetermined blocking threshold.

16. In a wireless communications network where an incoming request for service can be assigned to any one of a plurality of transmission channels, the interference levels of said plurality of transmission channels being less than a predetermined interference threshold, a method of assigning a channel to service comprising the steps of:
    determining the interference of all of said plurality of transmission channels in the network;
    measuring the channel quality of all of said plurality of transmission channels in the network;
    segregating the plurality of transmission channels into interference bands according to levels of interference;
    segregating the plurality of transmission channels into categories of channel quality according to levels of channel quality;
    preassigning a first channel to an incoming request for service;
    measuring the channel quality of the first channel; and
    reassigning the service from the first channel to a second channel when the channel quality of the first channel falls below acceptable levels for the network, the interference band of the second channel selected using variable reassignment.

17. The method of claim 15 further comprising the step of storing the interference bands and categories of channel quality into a configuration defining a rule table.

18. The method of claim 16 wherein the rule table is used in performing the step of reassigning the service from the first channel to a second channel.

19. The method of claim 15 further comprising the step of dropping the service when the channel quality category of the first channel is unacceptable for the network.

20. The method of claim 15 further comprising the step of handing off the service when the channel quality category of the first channel is unacceptable for the network.

21. In a wireless communications network having a plurality of transmission channels, an device containing an algorithm for assigning transmission channels to service, said algorithm comprising:
    a discrimination function adapted to determine the interference and channel quality of transmission channels in the network;
    a preassignment function adapted to preassign a first transmission channel with an interference level less than a predetermined blocking threshold of interference to the service;
    a monitoring function adapted to continually monitor the channel quality of the preassigned transmission channel; and a variable reassignment function adapted to reassign a second transmission channel to the service when the monitored levels of channel quality become unsatisfactory.

22. The device of claim 20 wherein said algorithm resides in a base station controller of said wireless communications network.

23. The device of claim 20 wherein said algorithm resides in a base station of said wireless communications network.

24. The device of claim 20 wherein said algorithm further comprises a segregation function for classifying said plurality of transmission channels according to channel quality.

25. The device of claim 23 wherein said segregation function is adapted to create categories of channel quality.

26. The device of claim 24 wherein said segregation function is adapted to classify said plurality of transmission channels according to level of interference.

27. The device of claim 23 wherein said segregation function is adapted to create bands of interference.

28. The device of claim 26 wherein said segregation function is adapted to create a rule table containing a configuration of said categories of channel quality and bands of interference.

* * * * *